(12) United States Patent
Klier et al.

(10) Patent No.: US 9,969,366 B2
(45) Date of Patent: May 15, 2018

(54) COMBINATION TOOL FOR USE WITH ICE AND SNOW

(71) Applicant: 51 Club, LLC, Colbert, WA (US)

(72) Inventors: Kevin C. Klier, Colbert, WA (US); Daniel J. Klier, Encino, CA (US)

(73) Assignee: 51 Club, LLC, Colbert, WA (US)

( * ) Notice: Subject to any disclaimer, the term of this patent is extended or adjusted under 35 U.S.C. 154(b) by 0 days. days.

(21) Appl. No.: 15/429,886

(22) Filed: Feb. 10, 2017

(65) Prior Publication Data

US 2017/0232939 A1    Aug. 17, 2017

Related U.S. Application Data

(60) Provisional application No. 62/388,907, filed on Feb. 11, 2016.

(51) Int. Cl.
| | | |
|---|---|---|
| *B60S 3/04* | (2006.01) | |
| *A46B 15/00* | (2006.01) | |
| *E01H 5/02* | (2006.01) | |
| *A47L 1/13* | (2006.01) | |

(52) U.S. Cl.
CPC .......... *B60S 3/045* (2013.01); *A46B 15/0081* (2013.01); *A47L 1/13* (2013.01); *E01H 5/02* (2013.01); *A46B 2200/3046* (2013.01)

(58) Field of Classification Search
CPC ......... E01H 5/02; E01H 5/12; A46B 15/0081; A46B 2200/3046; B60S 3/045; B25G 1/04; B25G 1/06
USPC ................ 294/51, 59; 15/111, 236.02, 257.2
See application file for complete search history.

(56) References Cited

U.S. PATENT DOCUMENTS

| 2,245,692 | A | * | 6/1941 | Lamb John M | ......... A01B 1/02 172/378 |
|---|---|---|---|---|---|
| 3,017,649 | A | * | 1/1962 | Racicot | ..................... A47L 1/06 15/105 |
| D193,887 | S | | 10/1962 | Hauser | |
| 4,067,107 | A | | 1/1978 | Scafetta | |
| 4,865,372 | A | * | 9/1989 | Gabriel | .................... A01B 1/00 294/49 |
| 4,993,768 | A | * | 2/1991 | Ewen | ...................... A01B 1/20 238/14 |

(Continued)

FOREIGN PATENT DOCUMENTS

| CN | 202135894 U | 2/2012 |
|---|---|---|
| DE | 10011106 A1 | 10/2001 |

*Primary Examiner* — Dean J Kramer
(74) *Attorney, Agent, or Firm* — Sand & Sebolt

(57) ABSTRACT

A combination tool for use with ice and snow is provided to perform a plurality of different functions with as device. The combination tool includes a shovel that can also serve as a traction pad that grips a tire that has lost traction in the snow. The shovel has a scoop near its forward end that has an apex of an arcuate profile configured to align a tire with lugs on a vehicle. The shovel may be reinforced with a plurality of strengthening ribs or gussets to support the weight of snow during shoveling actions and support the weight of vehicles when used as a traction pad. The shovel may be formed as a monolithic uniform unibody member. A brush may be provided to enable the combination tool to have a first configuration with the brush and shovel nested together and a second configuration where they are connected end-to-end.

17 Claims, 14 Drawing Sheets

(56) References Cited

U.S. PATENT DOCUMENTS

| | | | | |
|---|---|---|---|---|
| 5,486,027 | A | * | 1/1996 | Dionne ................. A01B 1/022 238/14 |
| 5,661,868 | A | * | 9/1997 | Panagakos ........... A46B 5/0033 15/144.4 |
| 6,243,906 | B1 | | 6/2001 | Holliday et al. |
| 6,266,839 | B1 | * | 7/2001 | Oretti ..................... A46B 17/08 15/111 |
| 6,869,118 | B2 | * | 3/2005 | Bradford ................ A01B 1/02 294/51 |
| 7,347,468 | B1 | | 3/2008 | Tidcomb |
| 7,743,458 | B1 | * | 6/2010 | Moore ................. A46B 5/0033 15/144.1 |
| D710,790 | S | * | 8/2014 | O'Dell et al. ............... D12/608 |
| 2007/0085359 | A1 | | 4/2007 | Schouten |
| 2008/0179904 | A1 | * | 7/2008 | Huang ..................... B25G 1/08 294/51 |
| 2010/0102584 | A1 | | 4/2010 | Sanchez |
| 2014/0217759 | A1 | | 8/2014 | Uffner et al. |

* cited by examiner

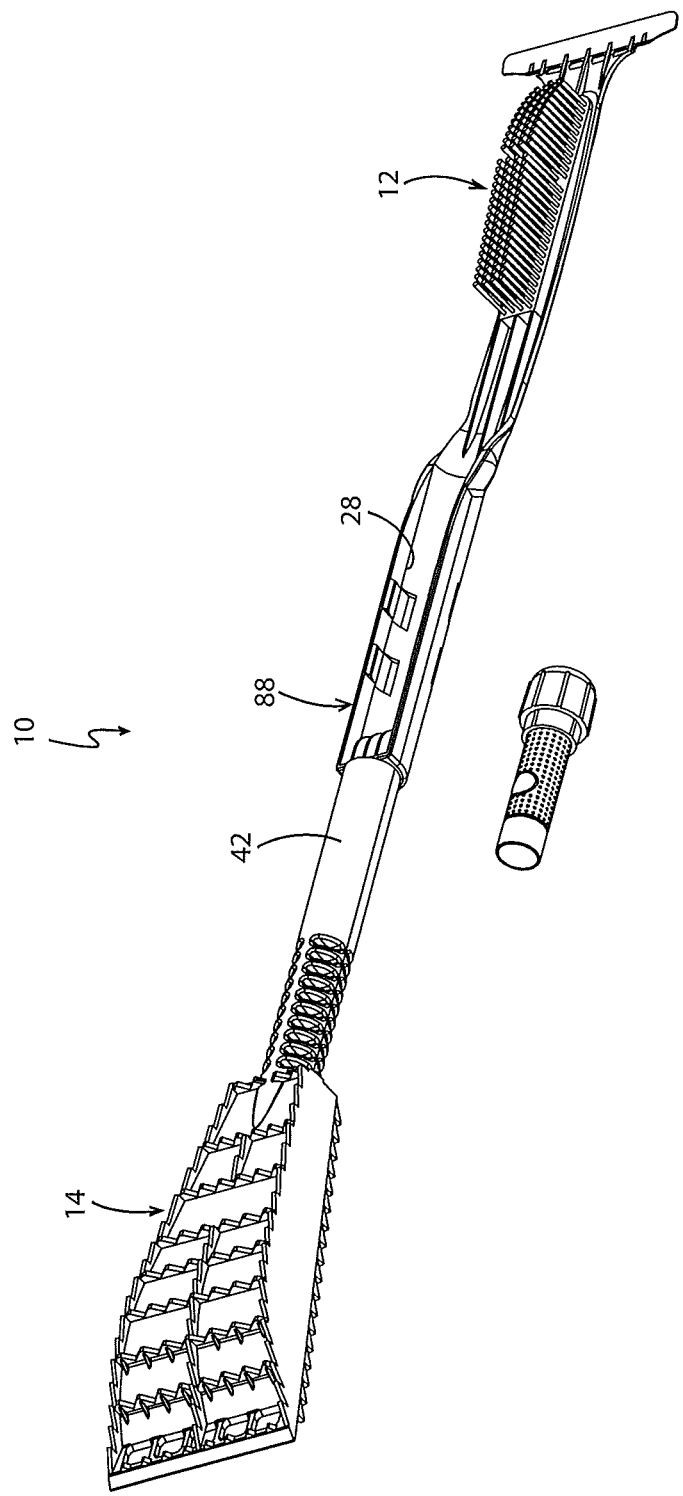

COMBINATION TOOL FOR USE WITH ICE AND SNOW

CROSS REFERENCE TO RELATED APPLICATIONS

This application claims the benefit of prior U.S. Provisional Application Ser. No. 62/388,907, filed on Feb. 11, 2016; the disclosure of which is incorporated herein by reference.

BACKGROUND

Technical Field

The present disclosure relates generally to hand tools relating to ice and snow. More particularly, the present disclosure relates to shovels and brushes used in the ice and snow. Specifically, the present disclosure relates to a combination tool that accomplished multiple functions relating to ice and snow with a single device.

Background Information

Snow shovels and ice scrapers have existed for a long time. Their utility is unquestioned inasmuch as when significant snowfall or ice accumulates, persons need to remove the snow or ice from objects for various purposes. Often people desire to remove snow and ice from near or around automobiles. Typically, snow is shoveled out from adjacent tires in order to provide the tires more traction to propel the car forward. Additionally, snow and ice are either brushed away or scraped off of various surfaces of the exterior of the vehicle Improvements of snow shovels and ice scrapers continue to be made and some examples are found in the following references: U.S. 2007/0085359; U.S. Pat. No. 6,243,906; U.S. D193,887; U.S. 2014/0217759; U.S. Pat. No. 4,067,107; DE 10011106; U.S. Pat. No. 7,347,468; U.S. 2010/0102584; and CN 20213589.

SUMMARY

Although snow shovels and ice scrapers continue to progress in their designs, issues continue to exist with currently known ice scrapers and snow shovels. Inasmuch as some of them are not strong enough to perform certain tasks, or are too large to perform a task in a small space, a need continues to exist for improvements on current snow shovel and ice scraper technology. The present disclosure discusses these and other issues.

In accordance with one aspect of the present disclosure, an embodiment may provide a combination tool with at least five (or more) separate functions, wherein the functions are a scraper, a torque bar, a tire lift, a shovel, and a traction pad. The combination tool provides a motorist with relief in many types of predicaments involving ice and snow. The tool may be manufactured from GF nylon or the like to provide rigidity and strength when accomplishing the aforementioned functions. The combination tool in one embodiment may have an overall length from about eighteen inches to about twenty-one inches with a forward end having a width of about five inches and an opposing second end being a one-inch diameter hollowed handle housing a cap. In one embodiment, the handle is about eight to ten inches long and the shovel end is about eight to eleven inches long with the leading edge that is five inches wide. The shovel tapers to a narrowing width of about two inches where the handle begins. When laid flat, the tool provides an arcuate surface on the back end of the shovel that faces upwardly. The back side of the shovel that is curved or arcuate has a plurality of rows of serrated edging or teeth. In one exemplary embodiment, the teeth are one-quarter inch high running perpendicularly or orthogonally relative to the longitudinal axis of the combination tool. At the forward facing five-inch wide edge of the tool lies a single row of serrated teeth which may act as a scraper. Alternatively, a scraper may be provided and the first row of teeth may be offset from the scraper a slight distance back from the first edge. In one embodiment, the teeth may be offset about five-eighths inch from the leading edge. An additional row of serrated teeth may be located at about four inches from the leading edge and another row of serrated teeth at about eight inches from the leading edge. The teeth on the shovel portion of the combination tool are utilized to remove snow and ice with a simple forward and backward movement of the tool above or along a snow-covered surface. The curved surface of the scooping member of the shovel acts as a fulcrum to lift a tire resting on the leading edge upwardly about two inches or three inches enabling a tire's placement onto an auto's hub connection with lugs. The shovel portion of the combination tool enables the easy removal of debris, such as snow, ice, and mud, from various locations, but specifically tire wheel wells. The serrated teeth or ridges on the backside of the shovel portion of the tool enable the combination tool to be used as a traction pad in slippery conditions. In this scenario, the tool is pressed up against a tire and then the vehicle is allowed to drive over the tool allowing the serrated ridges or teeth to grab the tire and extricating the vehicle from a slippery position. Furthermore, the combination tool having the hollowed handle enables for a lug nut wrench to fit inside the handle up to about four inches creating additional leverage and force to thereby make it easier to loosen or tighten lug nuts. When the cavity in the handle is not occupied with the lug nut wrench, a cap or plug at the end of the handle creates a storage place in which an item, such as a small flashlight, may be stored.

In accordance with an aspect of the present disclosure, an embodiment may provide a combination tool that can perform many functions. In one example, the combination tool may act as a shovel configured to shovel snow away from a desired area with the use of a handle. This embodiment may have a cavity formed in the handle of the shovel so as to allow a tire iron or another supplemental tool to be received therein. When used in the case of a tire iron, the length of the shovel may act as a lever arm to provide additional force to tighten or loosen a lug nut. This embodiment may provide an arcuate surface associated with the scoop of the shovel having a plurality of teeth extending therefrom designed to be positioned closely adjacent a tire of a vehicle in the snow so as to provide traction for the tire to roll over the top of the arcuate surface of the scoop to dislodge the vehicle from a snowy location. The leading edge of the shovel may be an ice scraper having a first width with vertical sidewalls extending rearwardly therefrom that taper inwardly towards each other and transversely extending strengthening ribs extending therebetween to support the weight of a car thereabove when the vehicle is moving over the arcuate surface of the scoop. Additionally, the combination tool of this embodiment has the functionality to provide a height defined by an apex formed in the arcuately curved surface of the scoop member on the shovel position a wheel at a certain height above the ground to assist in the changing of a tire. Furthermore, the other additional features are described in further detail herein.

In accordance with yet another aspect, an embodiment may provide a combination tool for use with ice and snow to perform a plurality of different functions with one device. The combination tool includes a shovel that can also serve as a traction pad with a plurality of upwardly extending teeth to grip a tire that has lost traction in the snow. The shovel has a scoop near its forward end that has an apex of an arcuate profile configured to align a tire with lugs on a vehicle. The shovel may be reinforced with a plurality of strengthening ribs or gussets to both support the weight of snow and ice during shoveling actions but also support the weight of vehicles when used as a traction pad. The shovel may be formed as a monolithic uniform unibody member. A brush may be provided with the combination tool to enable the combination tool to have at least two configurations. A first configuration with the brush and shovel nest together and a second configuration where they are connected end-to-end.

In accordance with yet another aspect, an embodiment of the present disclosure may provide a combination tool for use with ice and snow, the combination tool comprising: a first end and a second end defining a longitudinal direction therebetween, a first side and a second side defining a transverse direction therebetween, and a top and a bottom defining a vertical direction therebetween; a scoop associated with the first end having an upwardly facing convex surface and a downwardly concave facing surface; and a plurality of teeth extending outward from the convex surface of the scoop, the teeth adapted to grip a tire moving over the convex surface so as to allow the scoop to act as a traction pad for the tire. This embodiment or another embodiment may further provide a pair of opposing vertical sidewalls on the scoop that taper from a first width near the first end to a narrower second width offset towards the second end from the first end. This embodiment or another embodiment may further provide a handle connected to the scoop at a connection, wherein the second width is measured across the connection of the handle to the scoop, wherein a ratio of the first width to the second width is in range from 4:1 to 1.25:1. This embodiment or another embodiment may further provide wherein the connection is a reinforced connection adapted to support the force and weight of shoveling snow and ice. This embodiment or another embodiment may further provide a longitudinally aligned cavity formed in the handle adapted to receive smaller supplemental tools therein. This embodiment or another embodiment may further provide wherein the ratio is about 2.5:1. This embodiment or another embodiment may further provide a plurality of teeth extending downwardly from the pair of opposing vertical sidewalls on the scoop. This embodiment or another embodiment may further provide at least one longitudinally extending strengthening rib below the concave surface of the scoop. This embodiment or another embodiment may further provide at least one transversely extending strengthening rib below the concave surface of the scoop. This embodiment or another embodiment may further provide an apex of the convex upwardly facing surface of the scoop positioned at a height above the bottom of the combination tool, wherein the height is equal to a lug offset above ground surface adapted to assist in changing a tire on the vehicle.

In accordance with yet another aspect, an embodiment of the present disclosure may provide a combination tool for use with ice or snow, the combination tool comprising: a first end and a second end defining a longitudinal direction therebetween, a first side and a second side defining a transverse direction therebetween, and a top and a bottom defining a vertical direction therebetween; a shovel having a scoop and a shovel handle, wherein the scoop is associated with the first end and the shovel handle is associated with the second end, and the shovel is sized and strengthened to support the weight of snow and ice during a shoveling motion; a brush having bristles and a brush handle; wherein the brush and shovel are selectively connected in a first configuration and a different second configuration; and wherein when the combination tool is in the first configuration, the bristles nests within the scoop near the first end and the shovel handle and the brush handle nest near the second end. This embodiment or another embodiment may further provide wherein when the combination tool is in the second configuration, the shovel handle connects to the brush handle in a longitudinally aligned manner and the bristles are offset opposite from the scoop relative to the connection between the shovel handle and the brush handle. This embodiment or another embodiment may further provide a pair of vertical sidewalls on the scoop tapering from a first width to a narrower second width, wherein the bristles nest between the pair of vertical sidewalls in the first configuration. This embodiment or another embodiment may further provide an extension piece shaped complementary to cavity so as to allow the cavity to receive the extension piece in the second configuration to thereby establish the connection between the shovel handle and the brush handle. This embodiment or another embodiment may further provide an accessory tool having a width smaller than the cavity and disposed within the cavity when the combination tool is in the first configuration. This embodiment or another embodiment may further provide a first scraper on the shovel defining the first end of the tool; and a second scraper on the brush, wherein the second scraper is positioned closely adjacent the first scraper in the first configuration. This embodiment or another embodiment may further provide a plurality of teeth extending upwardly from a convex surface of the scoop, wherein the teeth are oriented to enable traction for an object moving over the convex surface. This embodiment or another embodiment may further provide a plurality of teeth extending downwardly from a concave surface of the scoop adapted to engage a ground surface while the object moves over the convex surface. This embodiment or another embodiment may further provide wherein the brush has a first length and the shovel has a second length, wherein a ratio of the first length to the second length is in range from about 0.8:1 to about 1.5:1. This embodiment or another embodiment may further provide wherein the scoop has a concave surface defining an arcuate profile when viewed in cross section, and the bristles on the brush having a complementary arcuate profile relative to the concave surface for nesting therewith in the first configuration.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 14 is a top perspective view of the combination tool in the second configuration.

Similar numbers refer to similar parts throughout the drawings.

DETAILED DESCRIPTION

As depicted throughout FIG. 1-FIG. 14, a combination tool for use with ice and snow is shown generally at 10. The tool includes a brush 12 and a shovel 14. The tool 10 is convertible between two configurations. A first configuration (FIG. 1 and FIG. 2) enables the brush 12 to nest within portions of the shovel 14. A second configuration (FIG. 13 and FIG. 14), enables the respective handles (described in greater detail below) to be attached together to create and elongated tool.

Figure 7:
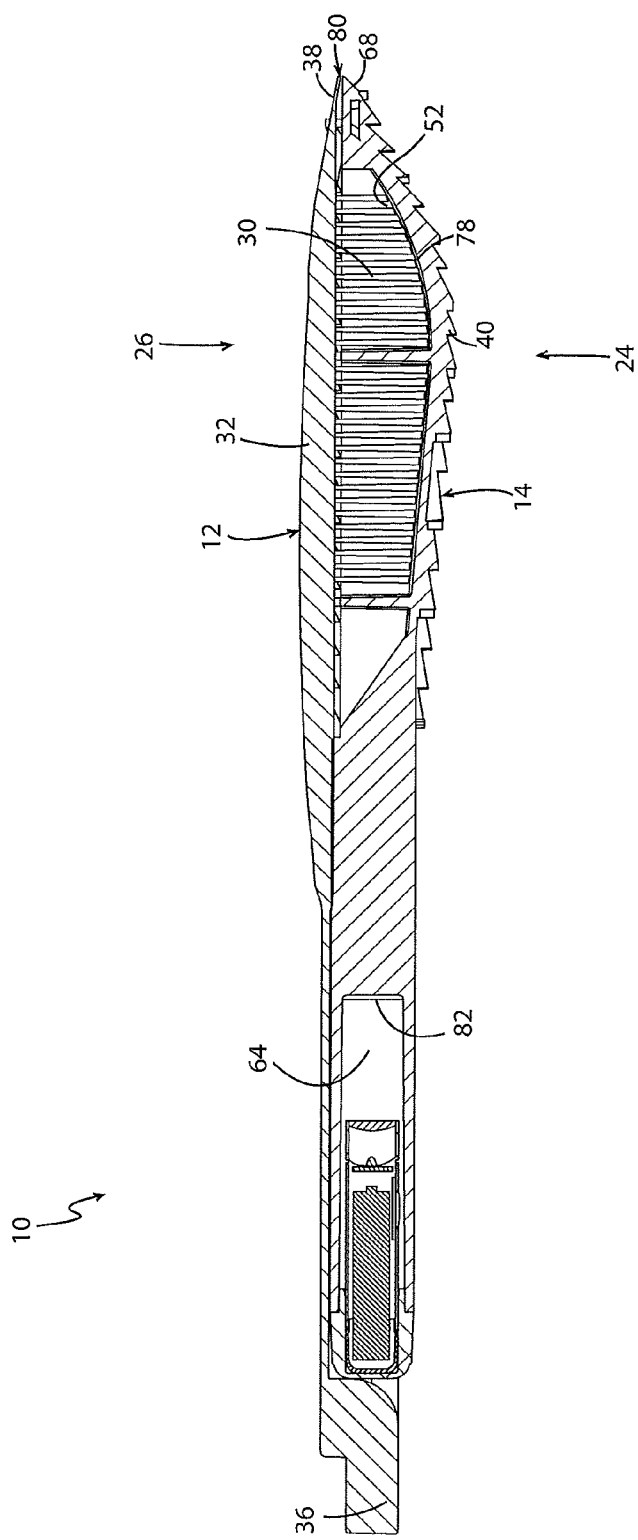
FIG. 7 is a longitudinal cross section view taken along line 7-7 in FIG. 6.

The tool 10 includes a first end 16 and a second end 18 defining a longitudinal direction therebetween along longitudinal axis X. The tool 10 includes a first side 20 and a second side 22 defining a transverse direction therebetween which is orthogonal to the longitudinal direction. The tool 10 includes a top 24 and a bottom 26 defining a vertical therebetween which is orthogonal to the longitudinal direction and the transverse direction. Reference numeral 24 relating to the top of tool 10 and reference numeral 26 relating to the bottom of tool 10 are used for convenience purposes and are not intended to be limiting. For example, as depicted in FIG. 7, the top 24 is oriented downwardly and the bottom 26 is oriented upwardly. Thus, this is one example in which terms are used for relative descriptive purposes and are not intended to be limiting.

Figure 9:
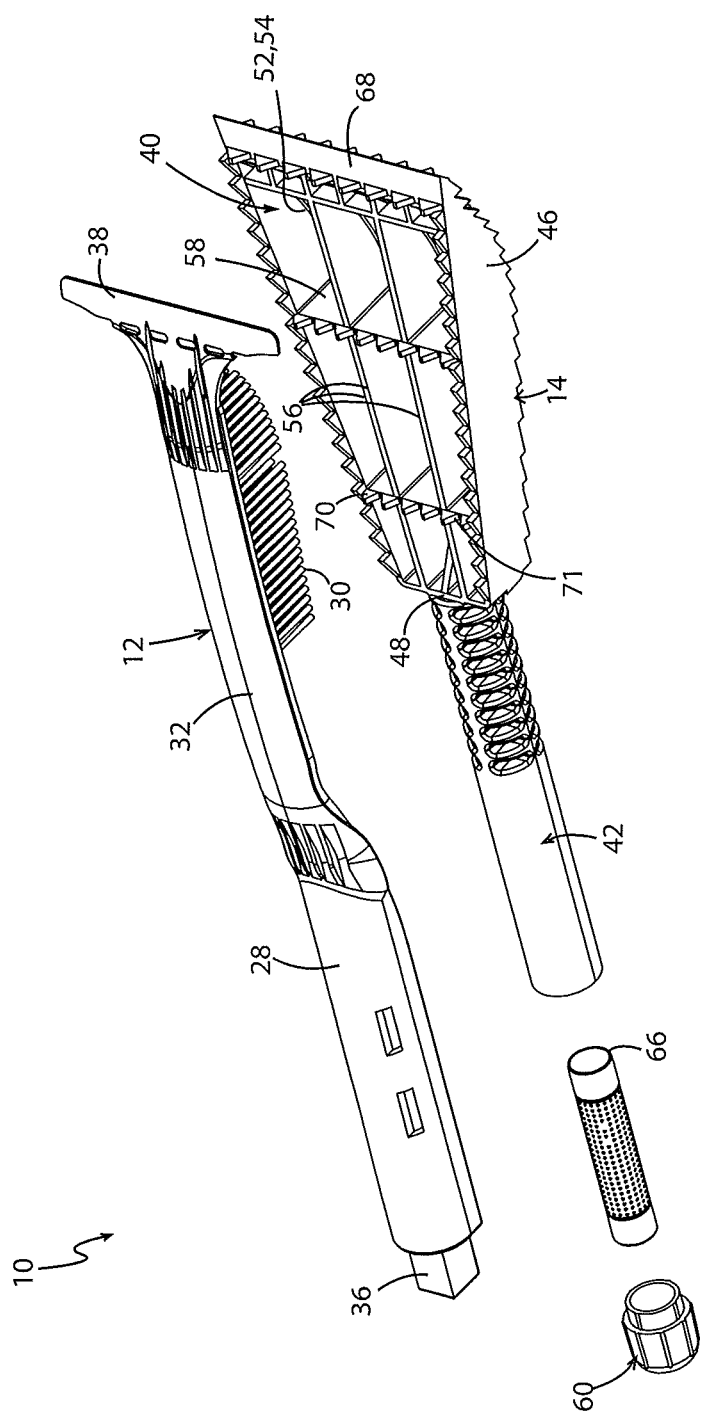
FIG. 9 is an exploded bottom perspective view of the combination tool.
Figure 10:
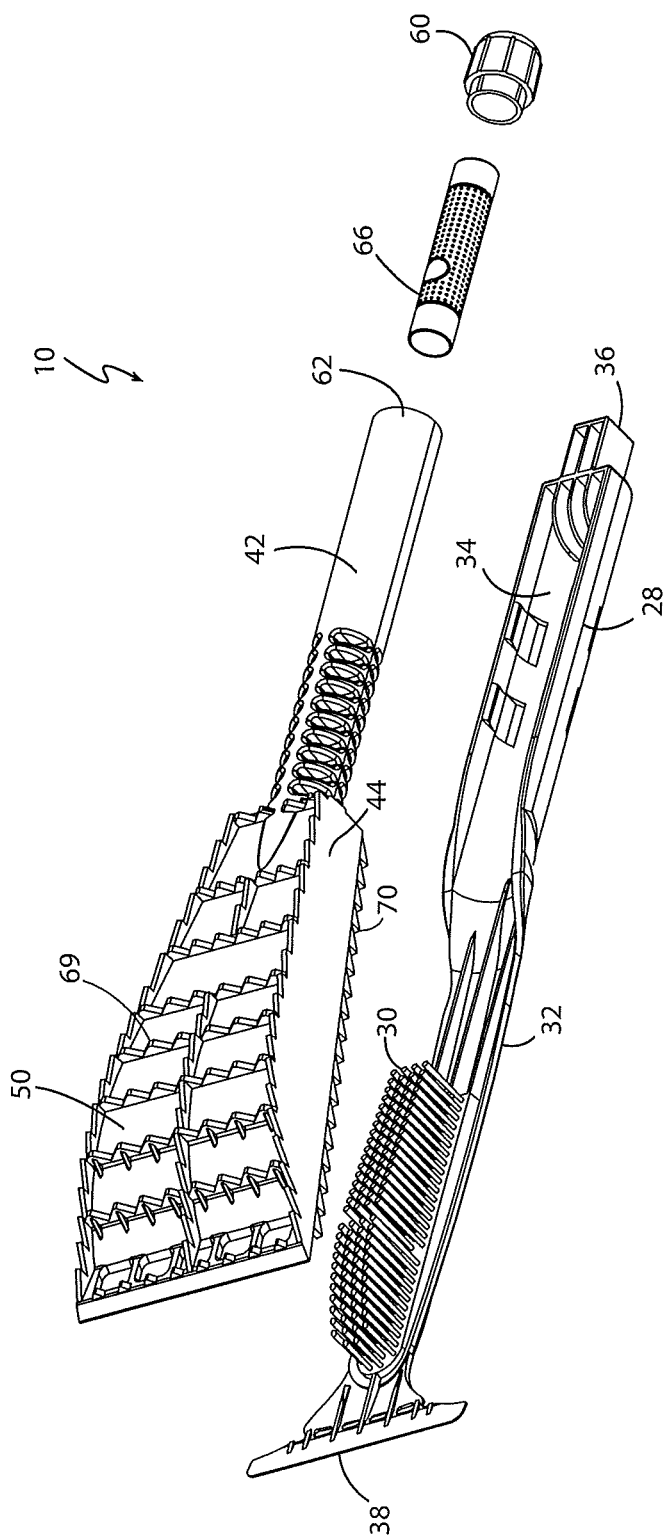
FIG. 10 is an exploded top perspective view of the combination tool.

Reference is first made to FIG. 9 and FIG. 10 in order to describe components of the brush 12 and shovel 14. Brush 12 includes a handle 28 and a plurality of bristles 30 supported by a longitudinally aligned and rigid bristle frame 32 connected with handle 28. Handle 28 may also be referred to as a first handle 28 or a brush handle 28. Handle 28 is substantially C-shaped in cross section defining a channel 34 therein configured to receive a complementarily shaped handle on shovel 14, as will be described in greater detail below. The C-shaped channel 34 is longitudinally aligned from a first forward end 16 adjacent the bristle frame 32 to a second or rear end 18 opposite the bristles 30. An extension member 36 extends longitudinally outward from the handle 28. The extension member 36 is sized to fit within a cavity formed within the handle 28 on shovel 14, as will be described in greater detail below, to effectuate the conversion from the first configuration to the second configuration. The end to which the bristles 30 are offset relative to handle 28 may sometimes be referred to as the "head" of brush 12.

The bristles 30 extend outwardly from the bristle frame 32 in a conventional manner and may have a plurality of bristle rows as one having ordinary skill in the art would understand. When viewed from the side, the terminal ends of the bristle tips define an arcuate profile as best seen in FIG. 7. The arcuate profile of the tips of bristles 30 is complementary to a surface of a scoop portion of shovel 14, as will be described in greater detail below. The curved profile of the tips of bristles 30 enable the brush 12 to nest within a scoop member portion of the shovel 14.

Forwardly from the bristles 30, a scraping blade or scraper 38 extends transversely. The width of the scraper 38 may be the widest portion of brush 12. In one particular configuration, the width of the scraper 38 relative to the bristle frame 32 would be approximately three times greater. Stated otherwise, the ratio of the transverse width of scraper 38 relative to the transverse width of bristle frame 32 may be about 3:1.

The brush 12 may be formed from injected molded plastics or polymers or metals such that the brush 12 is a substantially unibody or monolithic member, excluding the bristles 30 which may be formed form a different material. In one particular embodiment, the brush 12 is formed from glass filled (GF) polymers, plastic, or nylon or the like to provide rigidity and strength The shovel 14 includes a scoop or scoop member 40 and a handle 42. The scoop 40 and the handle 42 are formed as a monolithic unibody member, preferably from injection molded material such as plastics or other polymers. In one embodiment, the shovel 14 is formed from the same material as the brush 12. However, other embodiments may provide these two components to be formed from differing materials. The scoop 40 is oriented and associated with the first end 16 of the tool 10 and is positioned longitudinally forward from the handle 42 which is associated with the second end 18 of tool 10. The scoop includes a pair of opposing vertically extending sidewalls that taper towards each other when extending longitudinally from the first end 16 towards the second end 18 along the longitudinal axis. The handle 42 has longitudinal length and the scoop 40 a longitudinal length. A ratio of the first length (the handle 42 length) to the second length (the scoop 40 length) in a range from 0.5:1 to 2:1. In one particular embodiment the ratio of the first length to the second length is about 1:1. In one particular instance, when the scoop is about 10 inches long, the handle is 9¾ inches.

A first wall 44 is offset opposite the longitudinal axis X of the shovel 14 from a second wall 46. The transverse width separating the first wall 44 from the second wall 46 adjacent the first end 16 of the shovel 14 is approximately five inches. As the first and second walls taper towards each other relative to the longitudinal axis of the shovel 14, a second transverse width between the walls 44, 46 is established at a connection point 48 where the scoop 40 joins the handle 42. The second width between wall 44 and wall 46 at the connection point 48 is about two inches. Thus, as the walls 44,46 taper towards each other, a ratio of the first transverse width to the second width is about 2.5:1. However, it is entirely within the scope of this disclosure that the ratio of the first transverse width of the tapered walls 44, 46 adjacent the forward end 16 of shovel 14 relative to the second width at connection 48 may be anywhere in a range from about 4:1 to 1.25:1.

The scoop 40 includes an arcuate shovel wall having an upwardly facing convex surface 50 and a downwardly facing concave surface 52. The concave surface 52 of the scooping wall defines a scooping cavity 54 configured to shovel snow as one having ordinary skill in the art would understand. At least one longitudinally extending rib 56 is positioned within the scooping cavity 54 below the concave bottom surface 52. The at least one longitudinally extending rib(s) 56 may segment the scooping cavity 54 into a plurality of cavity segments as shown throughout the figures. In one particular embodiment and as depicted in FIG. 9, there are two longitudinally extending ribs 56 that segment scooping cavity 54 into three portions (a central portion and two outer portions). A central portion of cavity 54 is located between the two longitudinally extending ribs 56 has a transverse width equal to or slightly larger than the transverse width associated with the plurality of bristles 30. Accordingly, and as will be described in greater detail below, when the tool 10 is in the first configuration, the brush 12 fits or nests within shovel 14 so as to position the bristles 30 within the cavity 54 of the scoop 40 between the longitudinally extending ribs 56 (specifically in the central portion of cavity 54). Additionally, a plurality of transversely extending support ribs 58 may structurally support portions of the scoop member extending perpendicularly or orthogonally relative to longitudinally extending ribs 56. The ribs 56 and ribs 58 provide rigidity and strength to scoop 40 to enable the shovel 14 to have sufficient strength to shovel heavy snow, as well as provide rigidity and strength when the shovel 14 is utilized as a traction pad for allowing a car to move along over the upwardly facing convex surface 50 of the arcuate shovel wall.

The handle 42 extends longitudinally away from connection 48 in a cantilevered manner. Handle 42 is generally cylindrical in shape and may include a cap 60 which mateably engages a terminal end 62 of handle 42. The connection 48 of handle 42 with scoop 40 may be strengthened by one or more triangular strengthening ribs or gusset wedges. The triangular ribs are formed form the same material as the handle and scoop and are provided to enable the shovel 14 to fully support the weight and forces associated with shoveling snow. Accordingly, connection 48 is considered a reinforced connection that is adapted to support the force and weight of shoveling snow and ice.

Near the terminal end 62 of handle 42, an internal cavity 64 is defined by an inner surface of the handle, Cavity 64 (FIG. 7) extends towards connection 48 approximately half the length of handle 42. In one embodiment, the longitudinal length of cavity 64 is about four inches, however could be sized different for accomplishing a desired purpose. In one embodiment, cavity 64 is sized to receive a supplemental tool 66 such as a flash light or a portion of a tire iron therein. Additionally, cavity 64 is sized complementary to that of extension member 36 on handle 28 of brush 12 to encourage a frictional interference fit therewith. When cap 60 mateably engages with terminal end 62 of handle 42, the cavity 64 is enclosed, enabling a supplemental tool 66, such as flash light in FIG. 9, to be encased within cavity 64. Excluding the cap 60 and the supplemental tool 66, the remaining components of shovel 14 are formed from a unibody monolithic member preferably made from injection molded plastic.

With continued reference to FIG. 9 and FIG. 10, a plurality of teeth 69 are formed on the convex surface 50 of scoop 40 of shovel 14. In one particular embodiment, there are nine rows of transversely extending teeth 69 that are angled upwardly and form a plurality of peaks and valleys that are angled in a manner to assist in gaining traction for a tire or other object moving over the top 24 of tool 10. In one embodiment, the peaks of the teeth 69 are about one quarter inch above the convex surface 50 of scoop 40. As will be described in greater detail below, one exemplary use of tool 10 is to provide a traction pad for a tire which is slipping in ice or snow so as to allow the first end 16 of tool 10 to be mated closely adjacent the tire that is slipping to thereby allow the tire to grip onto the plurality of teeth 69 so as to provide traction for the tire.

To further assist with enabling a tire to gain traction in the ice or snow, a plurality of teeth 71 are formed and extend downwardly from the bottom 26 of scoop member 40. As depicted in FIG. 9, the bottom teeth 71 may include longitudinally extending teeth that extend downwardly from first and second sidewalls 44, 46, as well as a plurality of transversely extending teeth which extend downward from the transverse ribs 58. The downwardly facing teeth 71 are configured to engage the ground surface or frozen ice and snow on the ground to provide traction therewith while a tire or other object is moving over the top of the scoop member 40 from the first end 16 towards the second end 18 of tool 10. Moreover, as depicted in FIG. 9, one embodiment may provide three transverse rows of downwardly facing teeth 71, however other amounts of transverse rows are entirely possible.

Reference will now be made to FIG. 1-FIG. 8 to describe the tool 10 assembled in the first configuration. When the brush 12 is nested with the shovel 14, the scraper 38 nests closely adjacent a leading edge scraper 68 on the scoop 40. The transverse width of scraper 38 is similar to the transverse width of leading edge scraper 68 on scoop 40 of shovel 14. In one particular embodiment, scraper 38 lies just beneath scraper 68 to define a collective scraping edge 80 when the tool 10 is in the first configuration. The collective scraping edge 80 of the combined scraper 38 and scraper 68 enable an operator to scrape snow or ice from a surface utilizing the two edges that are close together.

Figure 1:
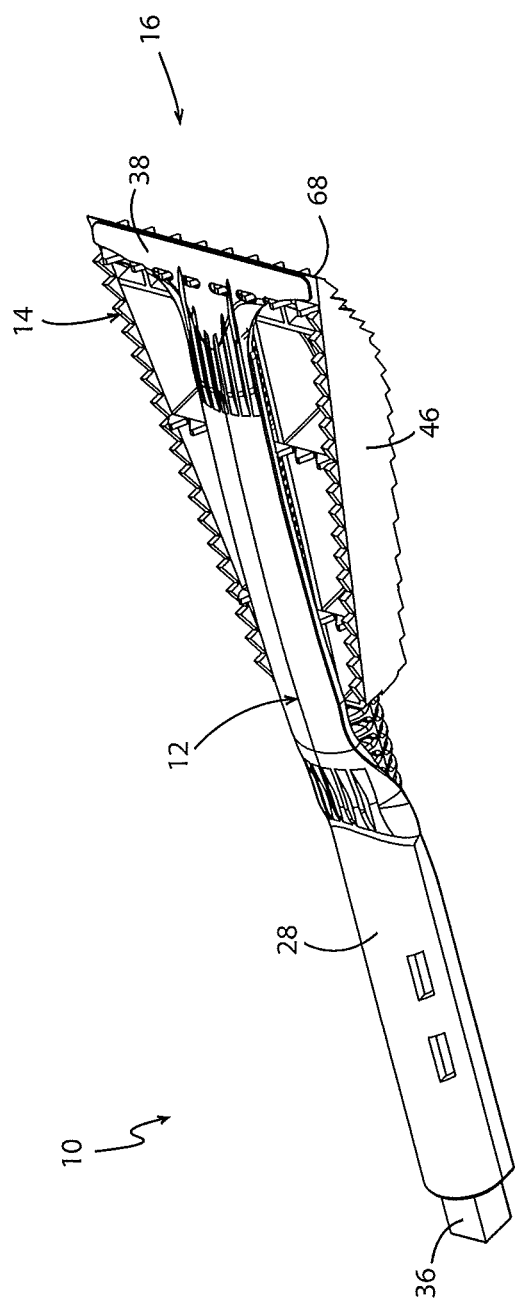
FIG. 1 is a bottom perspective view of a combination tool for use with ice and snow assembled in a first configuration in accordance with the present disclosure.
Figure 2:
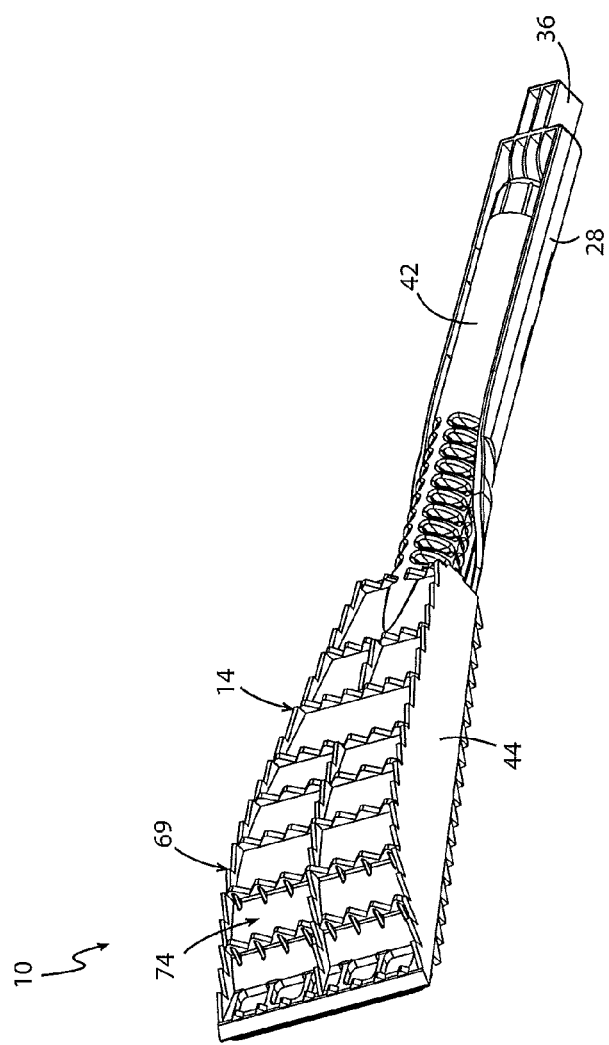
FIG. 2 is a top perspective view of the combination tool in the first configuration.

With continued reference to FIG. 1 and FIG. 2, the tool 10 in the first configuration enables the handle 42 of the shovel 14 to nest within the handle 28 of brush 12. Inasmuch as the handle 28 on the brush 12 is substantially C-shaped in cross section and the handle 42 on the shovel 14 is substantially cylindrical, the nesting relationship therebetween enables the handle 28 to at least partially surround the outer surface of handle 42. When viewed from the bottom, as seen in FIG. 1, the handle 42 on the shovel is substantially hidden from view behind handle 28 of the brush 12. When assembled in the first configuration, the extension members 36 can be seen extending outwardly beyond handle portion 28 to thereby define the second end 18 of the tool 10.

Figure 3:
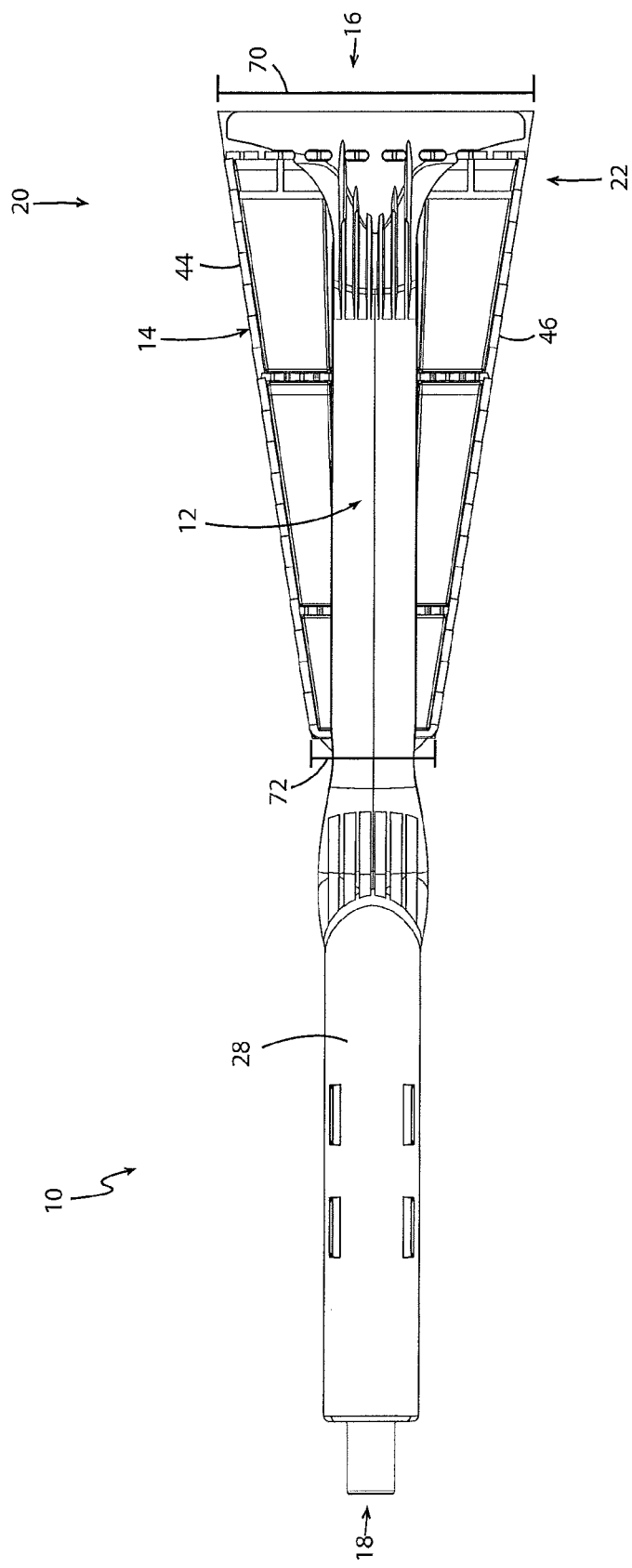
FIG. 3 is a bottom plan view of the combination tool in the first configuration.

As depicted in FIG. 1 and FIG. 3, when the tool 10 is in the first configuration, the bristles 30 on the brush 12 are positioned (i.e., nest) between longitudinally extending ribs 56 in a central portion of cavity 54 of the scoop 40. When viewed from the bottom, the side portions of cavity 54 are viewable and the central portion of cavity 54 is not viewable inasmuch it is occupied by portions of the brush 12, specifically the bristles 30.

FIG. 3 depicts the tapering of first sidewall 44 and second sidewall 46. Sidewalls 44, 46 taper towards each other and extend from the first end 16 towards the second end 18. As stated previously, a first transverse width 70 is associated with the first end 16 and a second transverse width 72 is associated with the terminal end of the first and second walls 44, 46 measured across the connection point 48. The ratio of the first width to the second width is approximately 2.5:1. For example, if the first width 70 is about five inches, then the second width 72 is about two inches. However, other size ratios are entirely possible. For example, the ratio of the first width 70 to the second width 72 may be in a range from about 4:1 to about 1.25:1. Thus, if the first width 70 is about ten inches, then second width 72 may be about eight inches. If the first width 70 is about eight inches, then the second width 72 may be about two inches. Or, if the first width 70 is about five inches, then the second width 72 may be about four inches (a ratio of 1.25:1). Or, other similar ratios within this range.

Figure 4:
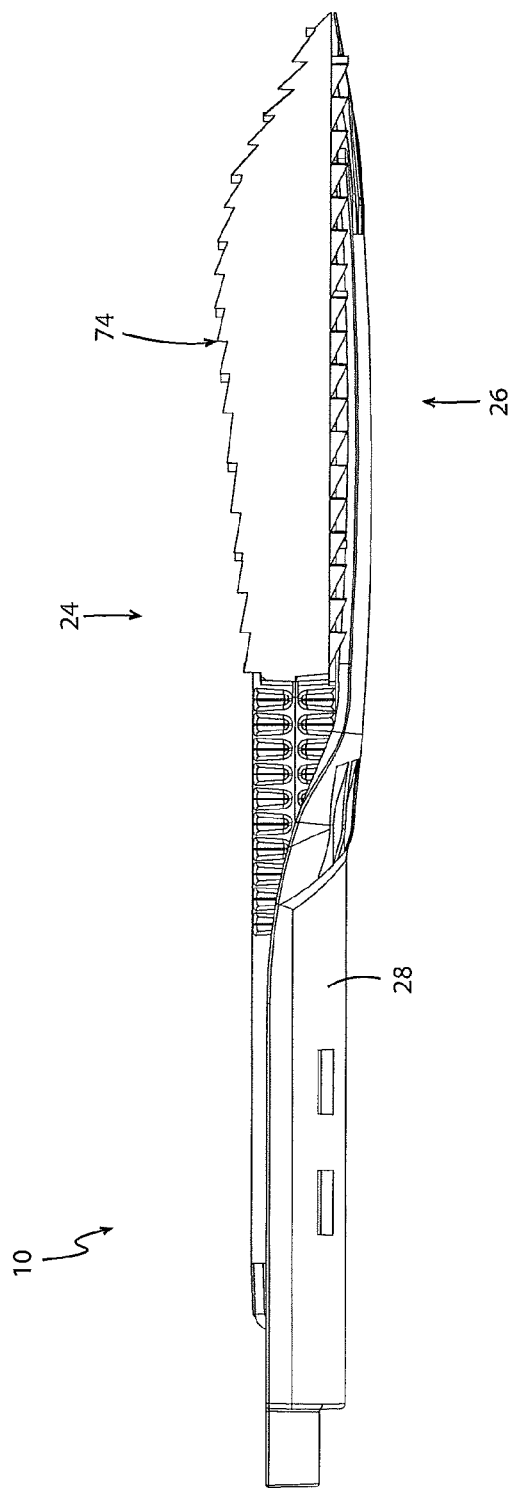
FIG. 4 is a side elevation view of the combination tool in the first configuration.

As depicted in FIG. 2 and FIG. 4, the plurality of teeth 69 on the upwardly facing convex surface 50 of scoop member 40 extend upwardly therefrom. Some of the teeth 69 may extend transversely between sidewalls 44, 46. In one exemplary implementation, there are nine rows of teeth 69 extending between vertical sidewalls 44, 46. Furthermore, there may be a longitudinally extending center row of upper teeth 69 that is transversely centered (i.e., coplanar with longitudinal axis X) and extends longitudinally between sidewalls 44, 46.

The upwardly facing convex surface 50 of scoop member 40 may define an apex 74 which represents the highest vertically uppermost point of tool 10 when tool 10 is viewed from the side (as shown in FIG. 4). When the tool 10 is in the first configuration with the brush 12 nested with the shovel 14, the apex 74 is located at height above the bottom surface 26 of tool 10 that corresponds to height needed for a person to change a tire. Stated otherwise, when a car has a flat tire removed and the car is lifted on a jack, the lugs receiving the rim of the tire are offset at a certain distance above ground. For example, if the lug is twenty inches above the ground and the lug aperture on the rim has a radius of seventeen inches to the outer edge of the tire, then the apex 74 would be three inches above the bottom surface 26 so as to allow the tire to rest on the apex 74 and enable the rim to be slidably received onto the lugs in order to effectively and easily change the spare tire.

With continued reference to FIG. 4, when tool 10 is in the first configuration having handle 42 nested within handle 28, the handle 42 on the shovel 14 is at least partially viewed from the side such that the C-shaped handle 28 does not fully circumscribe the cylindrical handle 42. Thus, when viewed from the side, handle 42 is slightly taller than handle 28.

Figure 5A:
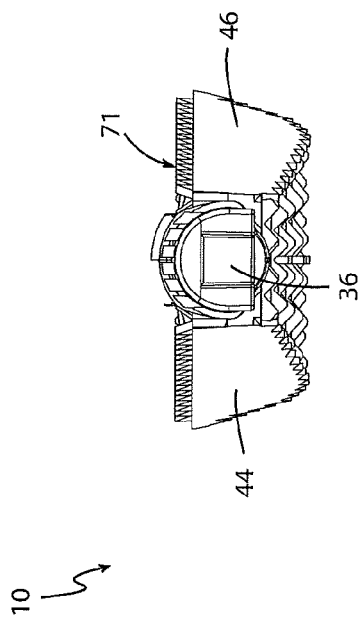
FIG. 5A is a second end elevation view of the combination tool in the first configuration.

As depicted in FIG. 5A, the major surfaces of the first vertical sidewall 44 and the second vertical sidewall 46 are viewable from the second end 18. The viewable amount of the major faces of the first and second sidewalls 44, 46 depends upon the tapering angle thereof. As described above, the tapering angle varies, but is usually about 2.5:1 of the first width 70 relative to second width 72.

Figure 5B:
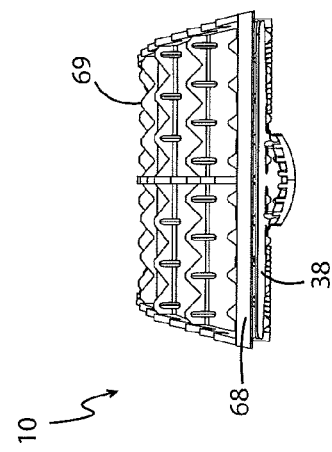
FIG. 5B is a first end elevation view of the combination tool in the first configuration.

As depicted in FIG. 5B, when viewed from the first end 16, the major surfaces of the first and second sidewalls 44, 46 are not viewable due to the tapering angle discussed above. However, the upwardly facing teeth 69 extending upwardly from the convex top surface 50 of the scoop 40 are viewable and are angled in a manner so as to perform the function of a traction pad to encourage gripping of the tire moving thereover. Furthermore, while the transversely centered middle row of upwardly extending teeth 69 are depicted in FIG. 5B, it is to be understood that any number of longitudinally extending teeth 69 are entirely possible. Moreover, the angled upwardly extending teeth from the convex surface 50 define a plurality of peaks and valleys that are sized and configured to grasp a tire to encourage movement thereover when the remaining tires of the vehicle are either stuck or slipping on ice.

Figure 6:
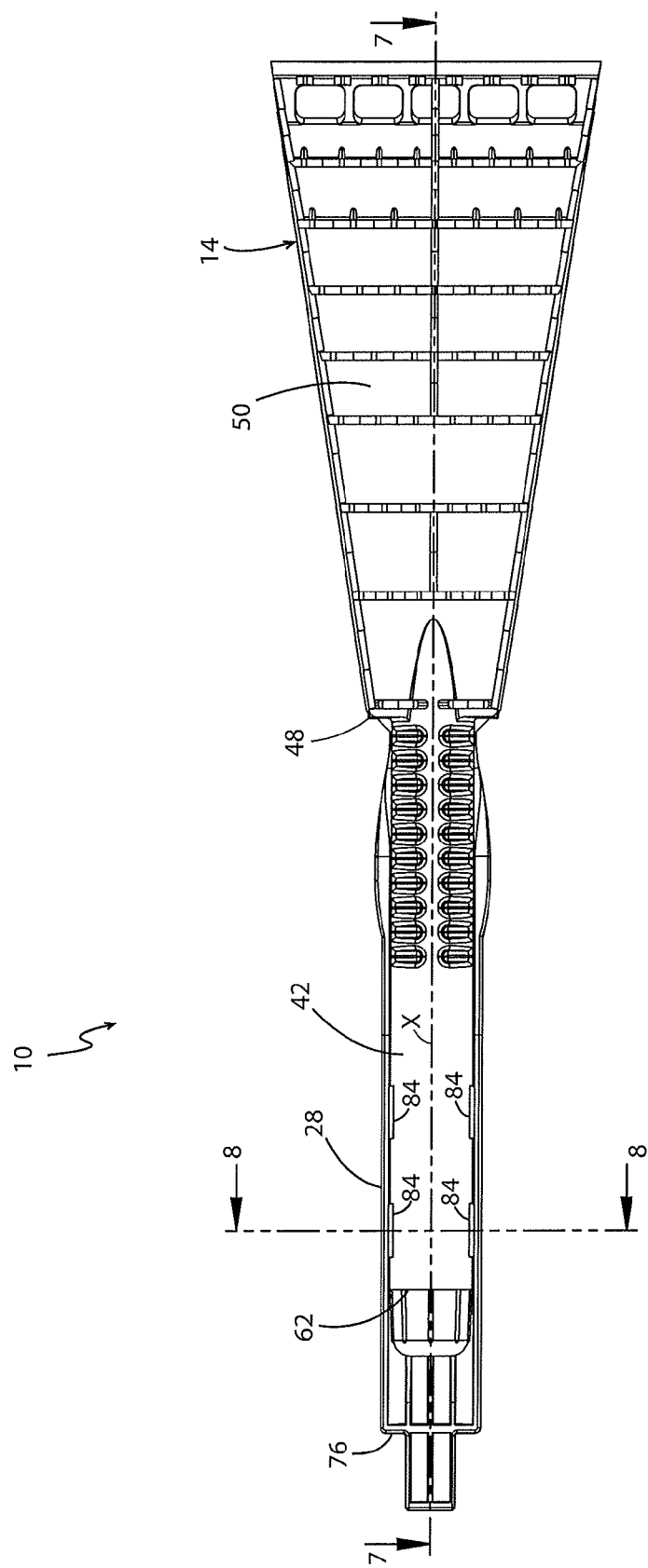
FIG. 6 is a top plan view of the combination tool in the first configuration.

As depicted in the top view of FIG. 6, when the brush 12 is nested within the shovel 14, the first handle 28 circumscribes the second handle 42 which may also be referred to as a shovel handle 42. Stated otherwise, when the bristles 30 are nested within the scoop 40, the second handle 42 nests within the first handle 28. In this particular embodiment, the entire brush 12 does not nest within the shovel 14, only a portion of the brush 12 nests within shovel 14. As shown, the bristles 30 nest within the scoop 40. However, a portion of the shovel 14 nests within the brush 12. As shown, the handle 42 of shovel 14 nests within the C-shaped handle 28 of brush 12. Accordingly, in the top view of FIG. 6, the bristles 30 are not shown as being beneath the opaque surface 50 and the handle 42 is seen as being nested or receiveably retained in handle 28.

When the handle 42 of the shovel 14 is nested within the C-shaped handle 28 of brush 12, it is shown that the longitudinal length of handle 42 is slightly shorter than the longitudinal length of handle 28. The length of the handle 42 is measured from the terminal end 62 to the connection point 48. The longitudinal length of handle 28 is measured from an end wall 76 to a point transversely coplanar with connection point 48. Given that the length of the handle 28 is slightly longer than the handle 42 of the shovel 14, a ratio is established of the length of handle 28 relative to the length of handle 42. In one particular embodiment, the ratio of the length of handle 28 relative to the length of handle 42 may be in a range from about 2:1 to about 1.05:1. In one particular embodiment, the ratio of the length of the first handle 28 relative to the length of the second handle 42 is about 1.2:1. Thus, when the first handle is about 12 inches, the second handle 42 is about 10 inches.

As depicted in the longitudinal cross section of FIG. 7, the plurality of bristles 30 have an arcuate profile at their terminal ends opposite the bristle frame 32. The arcuate profile of the terminal ends of the bristle tips is generally represented at 78. The arcuate profile 78 of the terminal ends of the tips of bristles 30 are complementary to the inner concave surface 52 of scoop 40. Accordingly, when in the nesting first configuration, the bristles 30 closely abut inner surface 52 of scoop 40.

With continued reference to FIG. 7, the closely adjacent nesting relationship of scraper 38 and scraper 68 are depicted to thereby define collective scraping leading edge 80. Collective scraping edge 80 is formed by the mating of scraper 38 with scraper 68 in the first configuration. Accordingly, as will be described in greater detail below, the collective scraping edge 80 is non-existent when the tool 10 is in the second configuration. The collective scraping edge 80 may be utilized to scrape ice or snow from a surface, and when doing so, the user would collectively grasp the first handle 28 and the second handle 42. (Note: in the appended claims, the term "first scraper" may apply to scraper 68, and the term "second scraper" may apply to 38).

With continued reference to FIG. 7, near the second end 18 of tool 10, the cavity 64 is clearly depicted as housing the supplemental tool 66 therein. The cavity 64 terminates with an inner end wall 82 that is located approximately halfway relative to the length of handle 42 on shovel 14. The diameter of end wall 82 defines the width of cavity 64. In one particular embodiment, cavity 64 has a width defined by the diameter of end wall 82 that is equal to, or slightly larger than, the width of a conventional four-way tire iron. Accordingly, it is contemplated that the shovel 14 may be used to provide additional leverage to unscrew or tighten stubborn lug nuts when needing to replace a tire. For example, a four-way tire iron may be attached to a lug nut and an orthogonal arm of the tire iron may be inserted into cavity 64 and an operator may push down on the shovel adjacent the scraper 68 near the first end 16 to produce a longer lever arm to thereby impart a greater force to the lug nut to loosen or tighten the same.

Figure 8:
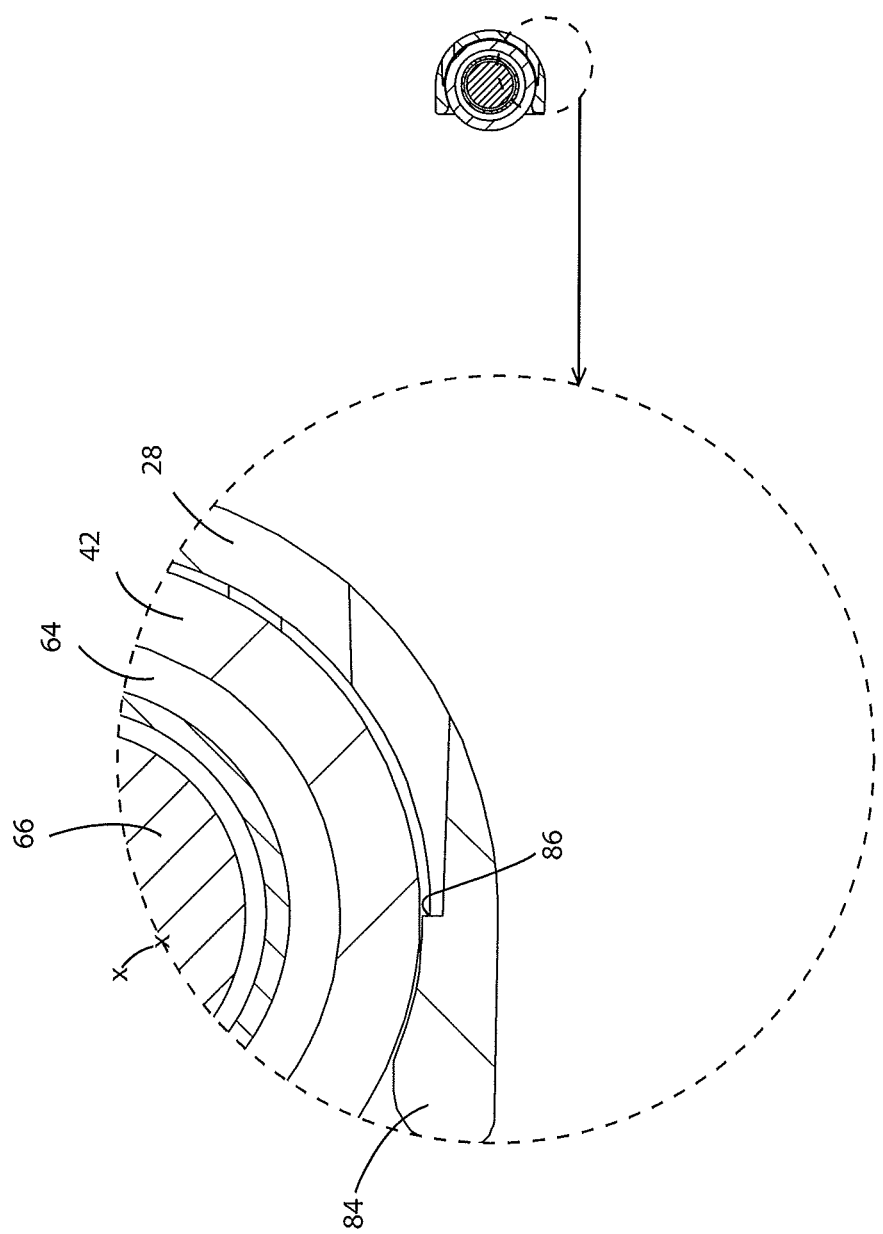
FIG. 8 is a transverse cross section taken along line 8-8 in FIG. 6 with a call out region depicting an enlarged connection of a shovel handle with a brush handle.

As depicted in FIG. 8, the call out region depicts an enlarged portion of the connection between the handle of the shovel 14 and the C-shaped handle 28 of the brush 12. The C-shaped handle 28 on brush 12 may include an enlarged end knob 84 defining a ledge 86 configured to attach to the handle 42 of the shovel 14 offset to one side from the longitudinal axis X of the tool 10. Inasmuch as the ledge 86 goes beyond the longitudinal axis X, the C-shaped handle 28 is able to grip or otherwise grab onto handle 42 to releasably secure the same in the nesting position. Furthermore, as shown in FIG. 6, there may be a plurality of enlarged knobs 84 spaced along handle 28 to provide more gripping locations of handle 42.

Figure 11:
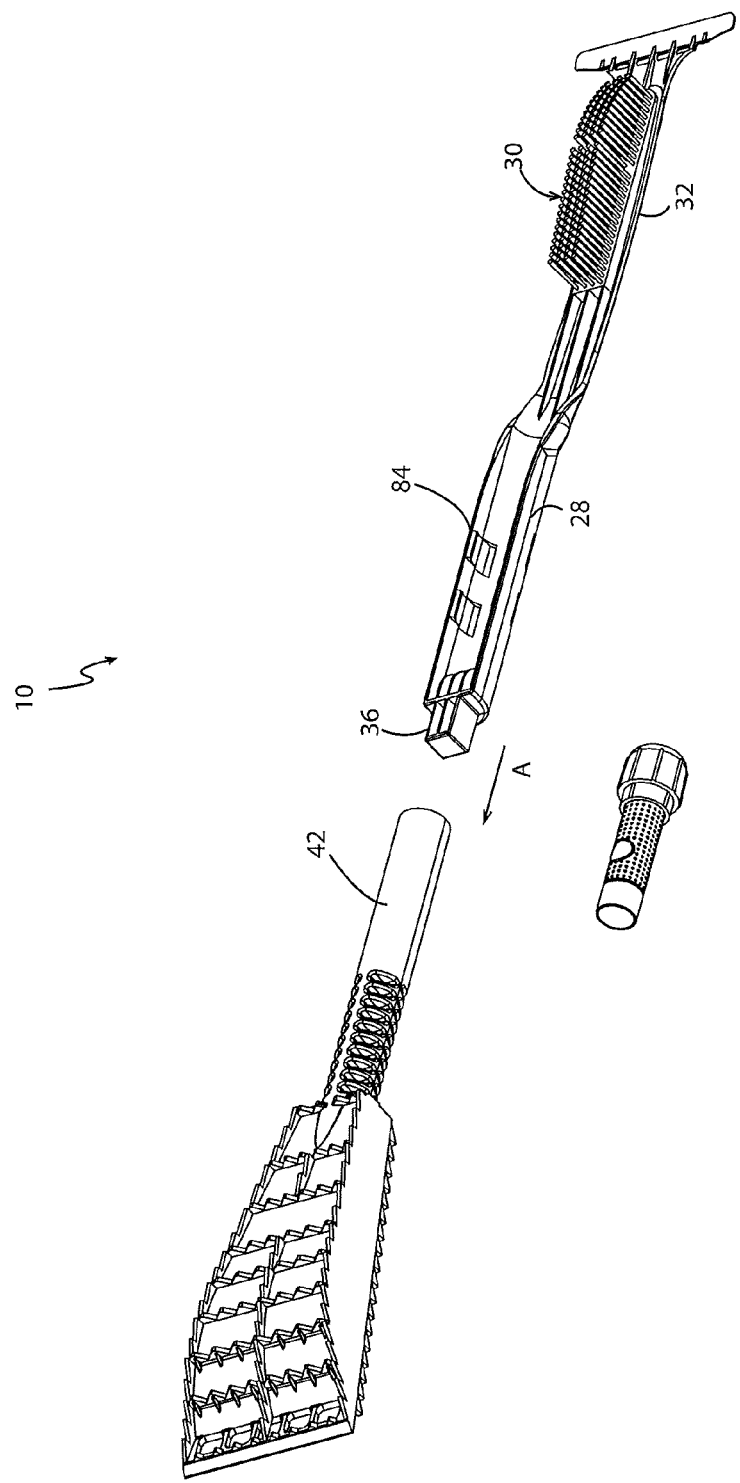
FIG. 11 is an exploded top perspective view with a brush component and a shovel component of the combination tool longitudinally aligned for later connection.
Figure 12:
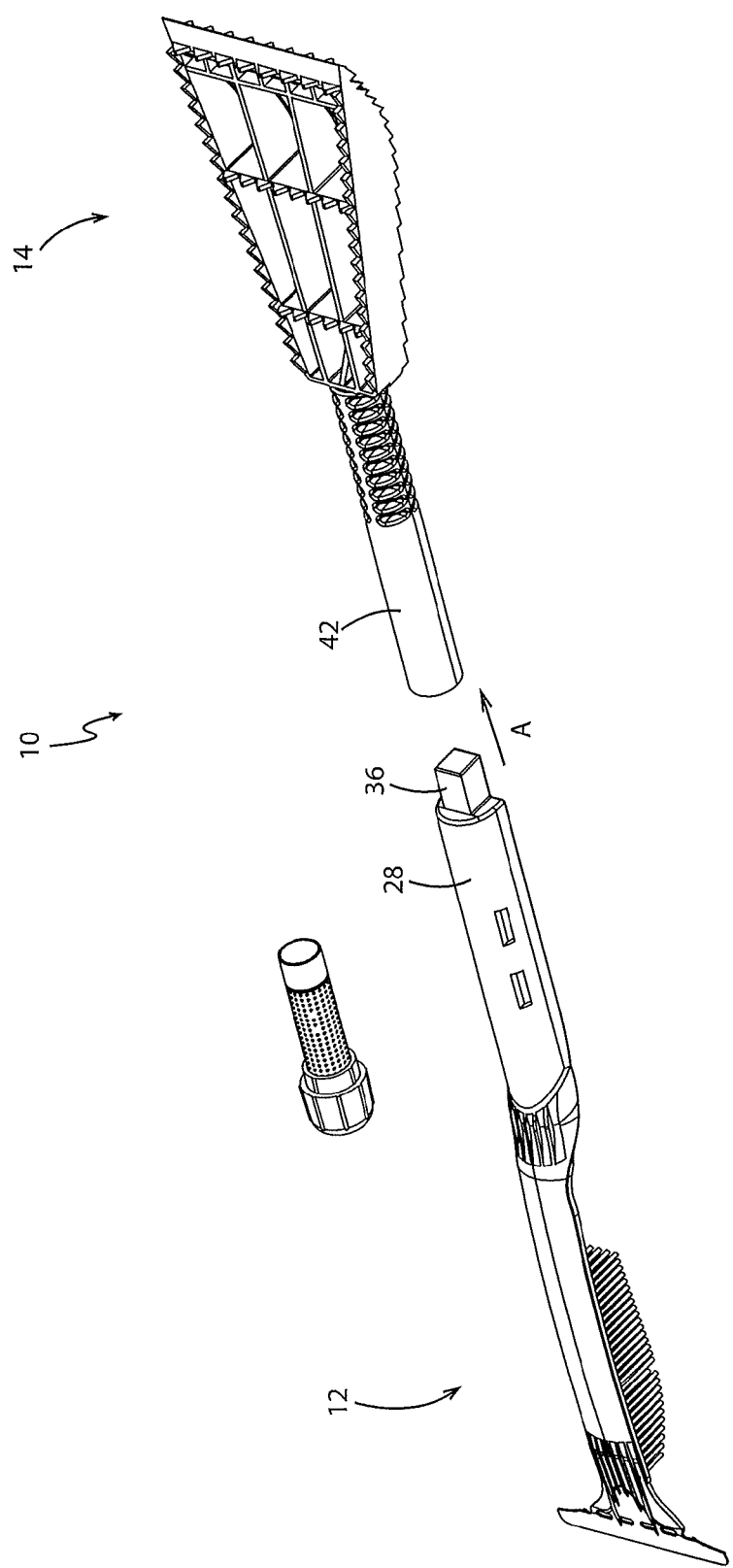
FIG. 12 is an exploded bottom perspective view of the shovel component and the brush component of the combination tool longitudinally aligned for later connection.

FIG. 11 and FIG. 12 depict the separation of the shovel 14 and the brush 12 and the removal of supplemental tool 66. When the end cap 60 has been removed from its connection with the terminal end 62 of handle 42, the supplemental tool 66 may be removed from cavity 64. Thereafter, the shovel 14 may be longitudinally aligned with the brush 12. FIG. 11 and FIG. 12 depict the longitudinal alignment of brush 12 and shovel 14 but have not established the connection therebetween. It is shown that the extension member 36 on handle 28 is sized and configured to align with handle 42 such that the extension member will slidably be received by cavity 64. The directional movement of the insertion of extension member 36 into cavity 64 is represented by arrow A.

Figure 13:
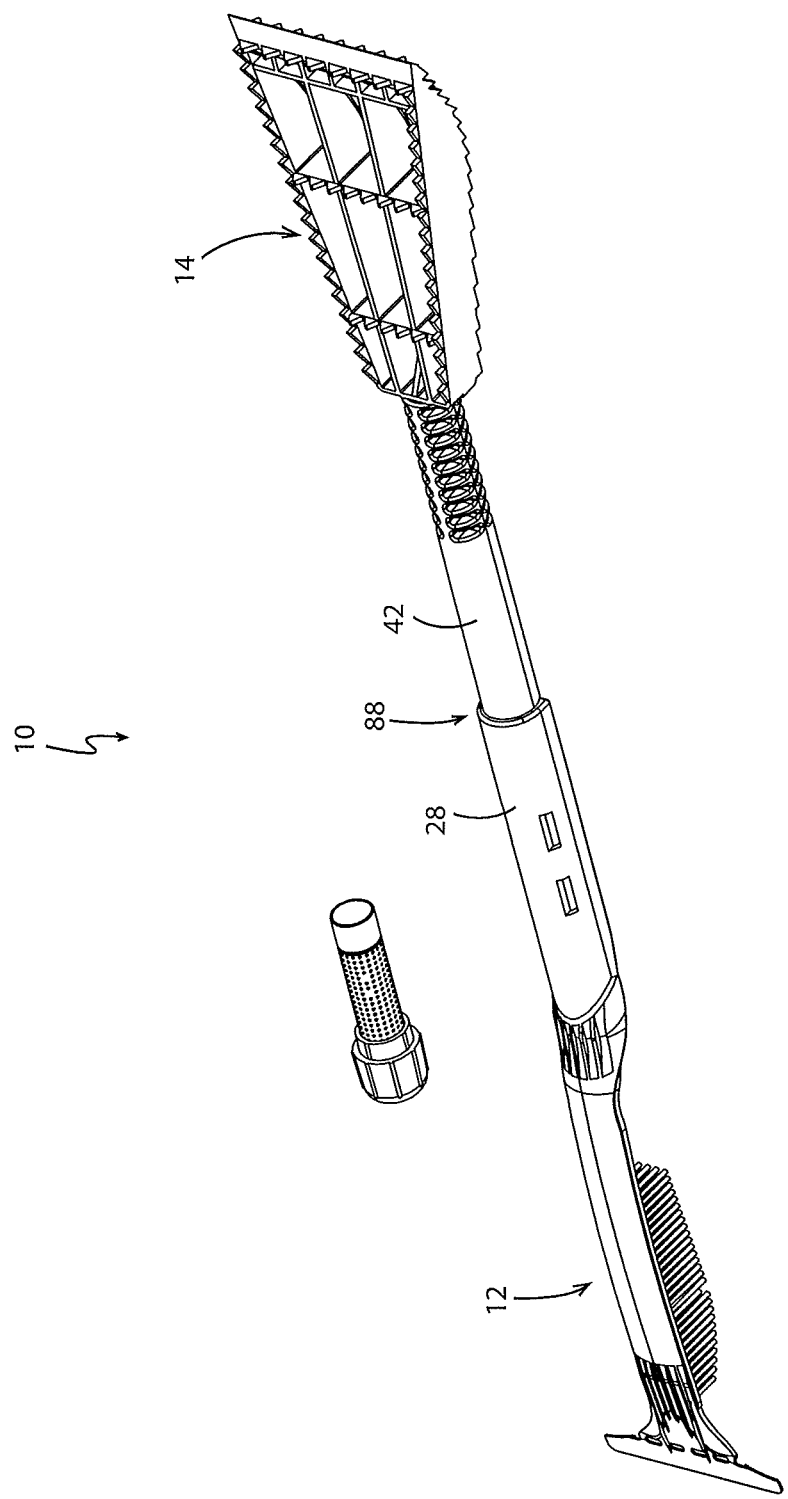
FIG. 13 is a bottom perspective view of the combination tool assembled in a second configuration with connection between ends of respective handles of the brush and the shovel.

FIG. 13 and FIG. 14 depict the combination tool for use with snow and ice in the second configuration. As described above, the extension member 36 is slidably received within cavity 64 to establish a connection 88 between the ends of handles 28, 42. When the combination tool 10 is in the second configuration, the scraper 38 of brush 12 defines one end of the tool 10 and scraper 68 of shovel 14 defines another end of the tool. When the handles 28, 42 are connected end-to-end, the tool 10 nearly doubles in length from the first configuration depicted in FIG. 1. The second configuration enables a user to grasp the collective and mated handles near connection 88 and simultaneously use either scraper 38 or scraper 68. Additionally, in the second configuration, a user could use the brush 12 to effectuate a brushing stroke or use shovel 14 to effectuate a scooping motion to remove snow from a surface. Because the longitudinal length of combination tool 10 nearly doubles from the second configuration to the first configuration, it can be stated that a ratio of the tool's length in the second configuration relative to the tool's length in the first configuration is in a range from about 1.5:1 to about 2.5:1. Thus, if the longitudinal length of the tool 10 in the first configuration is about twenty inches, then the longitudinal length of the tool 10 in the second configuration may be in a range from about thirty inches to about fifty inches.

In accordance with one aspect of the present disclosure, the combination tool 10 for use with ice and snow is designed to provide dual configurations wherein a first configuration is identified in FIG. 1-FIG. 8 and a second configuration is identified in FIG. 13-FIG. 14. The combination tool 10 is designed to provide a multifunction tool to allow an operator to accomplish various tasks in ice and snow. For example, the collective leading scraping edge 80 of tool 10 in the first configuration provides an ice scraper and the nested handles 28, 42 enable an operator to grasp the handle and maneuver the collective scraping edge 80 in a way to remove ice or snow from a surface such as a vehicle's windshield. The arcuate edge of the scoop 40 on shovel 14 having a plurality of upwardly extending teeth 69 is designed to perform as a traction pad to wedge beneath the tire that is slipping ice or snow to provide traction for the same to allow the tire to grab onto the teeth and drive over the surface 50 in order to dislodge the car from its stuck position.

In accordance with another aspect of the present disclosure, a plurality of downwardly extending teeth 71 are configured to grip the ground surface or ice while the car is moving over the top of the scoop member 40 with structural supportive ribs 56, 58. Furthermore, the handle 42 of the shovel 14 is sized to receive a tire iron inside a cavity formed within an opening in the terminal end 62 of the handle 42. The length of the shovel 14 enables extra leverage to be applied to the lug nut to remove or tighten the same. Furthermore, the arcuate profile of the upper surface of the scoop 40 on shovel 14 includes an apex 74 which is the highest point of the shovel when viewed in side elevation at a height above the ground to assist with the changing of a tire to alleviate the need for a person to lift the tire onto the set of lugs on the vehicle. Additionally, the combination tool 10 can be separated into exploded components as the shovel 14 may be used independently and the brush 12 may be used independently. In the second configuration, the combination tool 10 nearly doubles in length and connects the brush to the shovel end to end so as to create a center handle portion connected at connection point 88.

In operation and with respect to converting combination tool 10 from the first configuration to the second configuration, some of the following exemplary steps may be performed. An operator may grasp the C-shaped handle 28 on brush 12 and pull the handle 28 away from its nesting engagement with handle 42 so as to overcome the force of the enlarged knobs 84 which assist in the securement of handle 28 to handle 42. By forcibly separating handle 28, remaining portions of the brush 12, such as the bristle frame 32, will separate from its nesting engagement with shovel 14. This is primarily because brush 12 is formed as a monolithic unibody member formed of plastic or other polymer injection molded material. In another exemplary embodiment, the bristles 30 of the brush 12 may also be injection molded plastic and formed in the same mold. However, as one having ordinary skill in the art would understand, the bristles 30 may be respectively inserted into holes formed in the bristle frame 32 such that the handle 28, the bristle frame 32, and the scraper 38 are a unibody member, however the bristles 30 may be distinct pieces formed from material different than that of the remaining portions of brush 12.

As the user continues to separate handle 28 from handle 42, the bristles are released from their engagement between the longitudinally extending ribs 56 in the central portion of cavity 54. With the brush 12 fully separated and independent from the shovel 14, the two components are independent and may be used separately as indicated in FIG. 9 and FIG. 10. When separate, the brush 12 may be used as a traditional snow brush, the shovel 14 may be used as a traditional shovel to move snow or ice from a first location to a second location away from the first location. Additionally, the scraper 38 on brush 12 may be used as an independent ice scraper, and the scraper 68 on shovel 14 may be used as an independent ice scraper. Furthermore, the shovel 14 may be used as an independent traction pad for wheeled vehicles when separated from the brush 12.

Then, in order to move the brush 12 and shovel 14 into the second configuration, the handles 28, 42 are respectively longitudinally aligned such that the ends of each respective brush 12 and shovel 14 are opposite each other and the handles are connected end to end. In one particular embodiment, a user aligns an extension member 36 with the cavity 64 and inserts the extension member into cavity 64 in the direction of arrow A as indicated in FIG. 11 and FIG. 12. A frictional interference fit is established between the sidewalls of extension member 36 with the inner surfaces of cavity 64. However, other connection methods are entirely possible such as threaded or other non-mechanical connections. Once the connection 88 is established between the ends of the respective handles, the tool 10 is then in its second configuration as indicated in FIG. 13 and FIG. 14. The tool 10 in its second configuration may be used simultaneously as a shovel through the use of the scooping motion with scoop 40 or a brush with a brush stroke motion by moving bristles 30 over a surface. Furthermore, since the heads of the respective brush 12 and shovel 14 are opposite each other and each carries an independent scraper at its leading edge, the combination tool 10 in the second configuration may function as a dual scraper to enable an operator to scrape in both directions by moving their arm in a reciprocating manner so as to not waste energy moving back and forth, thereby allowing the scraping of ice in both directions in an attempt to save scraping strokes.

By way of additional reference, some advantages relating to the tapering of walls 44, 46 are for ease of manufacturing. For example, the tapering dimension (i.e., the ration of first width 70 to second width 72) has to do with the ability for the mold to shoot evenly and aggressively enough to create the shovel 14 as a single injection molded product. In one embodiment, the weight of the shovel 14 is about one pound. The tapering sidewalls 44, 46 provide the operator with the "look and feel" of a shovel so that use is readily identified. The tapering of sidewalls 44, 46 also cuts down on weight so most anyone can handle it when the arm is fully extended across the windshield of a vehicle during the snow and ice removal operation.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A combination tool for use with ice and snow, the combination tool comprising:
    a first end and a second end defining a longitudinal direction therebetween, a first side and a second side defining a transverse direction therebetween, and a top and a bottom defining a vertical direction therebetween;
    a scoop associated with the first end having an upwardly facing convex surface and a downwardly concave facing surface;
    a plurality of teeth extending outward from the convex surface of the scoop, the teeth adapted to grip a tire moving over the convex surface so as to allow the scoop to act as a traction pad for the tire;
    a pair of opposing vertical sidewalls on the scoop that taper from a first width near the first end to a narrower second width offset towards the second end from the first end; and
    a plurality of teeth extending downwardly from the pair of opposing vertical sidewalls on the scoop.

2. The combination tool of claim 1, further comprising:
    a handle connected to the scoop at a connection, wherein the second width is measured across the connection of the handle to the scoop, wherein a ratio of the first width to the second width is in range from 4:1 to 1.25:1.

3. The combination tool of claim 2, wherein the connection is a reinforced connection adapted to support the force and weight of shoveling snow and ice.

4. The combination tool of claim 2, further comprising:
    a longitudinally aligned cavity formed in the handle adapted to receive smaller supplemental tools therein.

5. The combination tool of claim 2, wherein the ratio is about 2.5:1.

6. The combination tool of claim 1, further comprising:
    at least one longitudinally extending strengthening rib below the concave surface of the scoop.

7. The combination tool of claim 6, further comprising:
    at least one transversely extending strengthening rib below the concave surface of the scoop.

8. The combination tool of claim 1, further comprising:
    an apex of the convex upwardly facing surface of the scoop positioned at a height above the bottom of the combination tool, wherein the height is equal to a lug offset above ground surface adapted to assist in changing a tire on the vehicle.

9. A combination tool for use with ice or snow, the combination tool comprising:
    a first end and a second end defining a longitudinal direction therebetween, a first side and a second side defining a transverse direction therebetween, and a top and a bottom defining a vertical direction therebetween;
    a shovel having a scoop and a shovel handle, wherein the scoop is associated with the first end and the shovel handle is associated with the second end, and the shovel is sized and strengthened to support the weight of snow and ice during a shoveling motion;
    a brush having bristles and a brush handle;
    wherein the brush and shovel are selectively connected in a first configuration and a different second configuration; and wherein when the combination tool is in the first configuration, the bristles nests within the scoop near the first end and the shovel handle and the brush handle nest near the second end;

wherein when the combination tool is in the second configuration, the shovel handle connects to the brush handle in a longitudinally aligned manner and the bristles are offset opposite from the scoop relative to the connection between the shovel handle and the brush handle.

10. The combination tool of claim 9, further comprising:
a pair of vertical sidewalls on the scoop tapering from a first width to a narrower second width, wherein the bristles nest between the pair of vertical sidewalls in the first configuration.

11. The combination tool of claim 9, further comprising:
an extension piece shaped complementary to a cavity defined by the shovel handle so as to allow the cavity to receive the extension piece in the second configuration to thereby establish the connection between the shovel handle and the brush handle.

12. The combination tool of claim 9, further comprising:
an accessory tool having a width smaller than a cavity defined by the shovel handle and disposed within the cavity when the combination tool is in the first configuration.

13. The combination tool of claim 9, further comprising:
a first scraper on the shovel defining the first end of the tool; and
a second scraper on the brush, wherein the second scraper is positioned closely adjacent the first scraper in the first configuration.

14. The combination tool of claim 9, further comprising:
a plurality of teeth extending upwardly from a convex surface of the scoop, wherein the teeth are oriented to enable traction for an object moving over the convex surface.

15. The combination tool of claim 14, further comprising:
a plurality of teeth extending downwardly from a concave surface of the scoop adapted to engage a ground surface while the object moves over the convex surface.

16. The combination of claim 9, wherein the brush has a first length and the shovel has a second length, wherein a ratio of the first length to the second length is in range from about 0.8:1 to about 1.5:1.

17. The combination of claim 9, wherein the scoop has a concave surface defining an arcuate profile when viewed in cross section, and the bristles on the brush having a complementary arcuate profile relative to the concave surface for nesting therewith in the first configuration.

* * * * *